(12) United States Patent
Kratschmar et al.

(10) Patent No.: US 7,531,259 B2
(45) Date of Patent: May 12, 2009

(54) FUEL CELL COOLING AND WATER MANAGEMENT SYSTEM

(76) Inventors: Kenneth W. Kratschmar, 3-2555 York Avenue, Vancouver, BC (CA) V6K 1E4; Jeremy S. Lindstrom, 3474 Nairn Avenue, Vancouver, BC (CA) V6S 4B5; Bob Korfman, 3860 Hamber Place, North Vancouver, BC (CA) V7G 2K1

( * ) Notice: Subject to any disclaimer, the term of this patent is extended or adjusted under 35 U.S.C. 154(b) by 0 days.

(21) Appl. No.: 11/823,553

(22) Filed: Jun. 28, 2007

(65) Prior Publication Data

US 2008/0032164 A1 Feb. 7, 2008

Related U.S. Application Data

(60) Provisional application No. 60/806,141, filed on Jun. 29, 2006.

(51) Int. Cl.
*H01M 8/04* (2006.01)
*H01M 2/14* (2006.01)
*H01M 8/00* (2006.01)

(52) U.S. Cl. .............................. 429/26; 429/24; 429/20; 429/38; 429/34; 429/39; 429/13

(58) Field of Classification Search ................... 429/26, 429/24, 20, 38, 34, 39, 13
See application file for complete search history.

(56) References Cited

U.S. PATENT DOCUMENTS 3,473,963 A * 10/1969 Sanderson .................... 429/23
6,617,065 B2 * 9/2003 Balasubramanian et al. .. 429/13

* cited by examiner

*Primary Examiner*—Patrick Ryan
*Assistant Examiner*—Angela J. Martin
(74) *Attorney, Agent, or Firm*—Trop, Pruner & Hu, P.C.

(57) ABSTRACT

A fuel cell system includes a fuel cell stack, a reservoir, a water management circuit, a cooling circuit and a fan. The fuel cell stack communicates a reactant flow and communicates a water flow. The water management circuit is adapted to remove water from the reactant flow and store the water in the reservoir. The cooling circuit is adapted to generate the water flow that is communicated through the fuel cell stack from the water in the reservoir. The fan controls the amount of water that is removed from the reactant flow to regulate a water level of the reservoir and controls removal of thermal energy from the water flow regulate a temperature of the fuel cell stack.

23 Claims, 2 Drawing Sheets

FUEL CELL COOLING AND WATER MANAGEMENT SYSTEM

This application claims the benefit under 35 U.S.C. § 119 (e) to U.S. Provisional Application No. 60/806,141, entitled "FUEL CELL COOLING AND WATER MANAGEMENT SYSTEM WITH MULTIPURPOSE COOLANT RESERVOIR," which was filed on Jun. 29, 2006, and is hereby incorporated by reference in its entirety.

BACKGROUND

The invention generally relates to a fuel cell cooling and water management system.

A fuel cell is an electrochemical device that converts chemical energy directly into electrical energy. There are many different types of fuel cells, such as a solid oxide fuel cell (SOFC), a molten carbonate fuel cell, a phosphoric acid fuel cell, a methanol fuel cell and a proton exchange membrane (PEM) fuel cell.

As a more specific example, a PEM fuel cell includes a PEM membrane, which permits only protons to pass between an anode and a cathode of the fuel cell. A typical PEM fuel cell may employ polysulfonic-acid-based ionomers and operate in the 50° Celsius (C) to 75° temperature range. Another type of PEM fuel cell may employ a phosphoric-acid-based polybenziamidazole (PBI) membrane that operates in the 150° to 200° temperature range.

At the anode of the PEM fuel cell, diatomic hydrogen (a fuel) ionizes to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

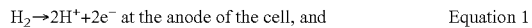

$$H_2 \rightarrow 2H^+ + 2e^- \text{ at the anode of the cell, and} \qquad \text{Equation 1}$$

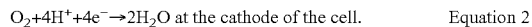

$$O_2 + 4H^+ + 4e^- \rightarrow 2H_2O \text{ at the cathode of the cell.} \qquad \text{Equation 2}$$

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Catalyzed electrically conductive gas diffusion layers (GDLs) may be located on each side of each PEM to form the anode and cathodes of each fuel cell. In this manner, reactant gases from each side of the PEM may leave the flow channels and diffuse through the GDLs to reach the PEM.

SUMMARY

In an embodiment of the invention, a fuel cell system includes a fuel cell stack, a reservoir, a water management circuit, a cooling circuit and a fan. The fuel cell stack communicates a reactant flow and communicates a water flow. The water management circuit is adapted to remove water from the reactant flow and store the water in the reservoir. The cooling circuit is adapted to generate the water flow that is communicated through the fuel cell stack from the water in the reservoir. The fan controls the amount of water that is removed from the reactant flow to regulate a water level of the reservoir and controls removal of thermal energy from the water flow regulate a temperature of the fuel cell stack.

In another embodiment of the invention, a technique that is usable with a fuel cell includes communicating a reactant flow through the fuel cell and communicating a water flow through the fuel cell. The communication of the water flow includes communicating the water flow through a circuit that includes a reservoir. The technique includes removing water from the reactant flow and storing the removed water in the reservoir. The technique also includes operating a fan to control the amount the water that is removed from the reactant flow to regulate a water level of the reservoir and control removal of thermal energy from the water flow to regulate a temperature of the fuel cell.

Advantages and other features of the invention will become apparent from the following drawing, description and claims.

DETAILED DESCRIPTION

Figure 1:
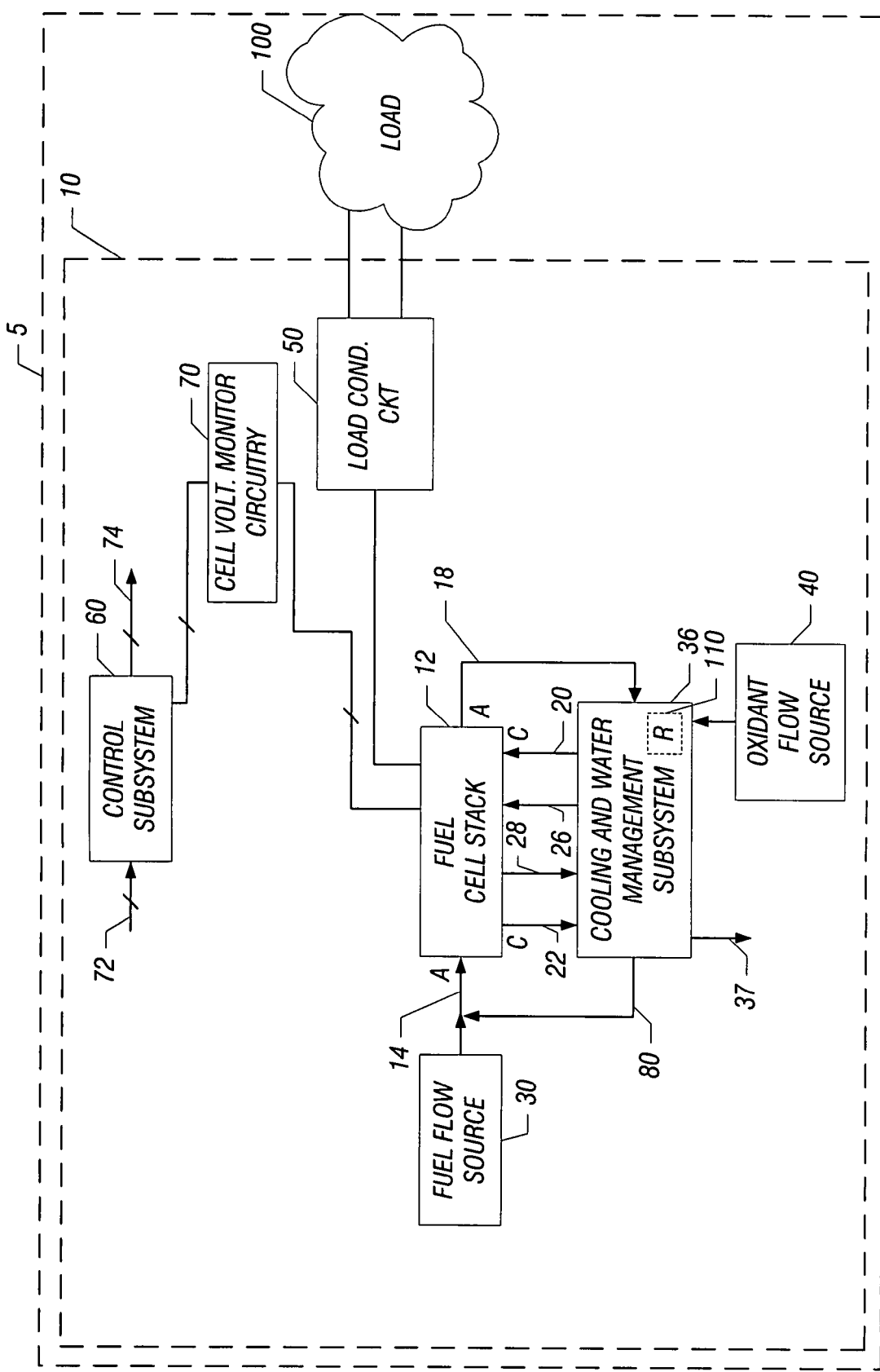
FIG. 1 is a schematic diagram of a fuel cell system according to an embodiment of the invention.

Referring to FIG. 1, an embodiment 10 of a fuel cell system in accordance with the invention includes a fuel cell stack 12, which produces electrical power for an external load 100 in response to fuel and oxidant flows. In this regard, the fuel cell stack 12 receives an incoming fuel flow at its anode inlet 14 from a fuel flow source 30. The fuel flow source 30 may be, as examples, a stored energy source (a hydrogen tank, for example) or, as an alternative, may be a reformer that produces a reformate flow (i.e., the fuel flow) in response to an incoming hydrocarbon flow (liquefied propane gas (LPG), as an example). The incoming fuel flow is communicated through the anode flow chambers of the fuel cell stack to promote electrochemical reactions in the fuel cell stack with the supplied oxidant flow.

In accordance with some embodiments of the invention, the anode flow produces a continuous anode exhaust at an anode output 18 of the fuel cell stack 12. The anode exhaust may be combusted by a flare or oxidizer; or may be partially routed back to the anode inlet or another inlet of the fuel cell stack 12; as just a few examples, depending on the particular embodiment of the invention. As another example, the anode chamber of the fuel cell stack 12 may be "dead-ended," or "dead-headed," which means that the anode chamber of the fuel cell stack 12 may not have a continuous outlet but instead may include an outlet that is intermittently purged for purposes of reducing removing inert gases (Nitrogen, for example) from the anode chamber. In some embodiments of the invention, the anode exhaust flow (which may be a purge flow or a re-circulate flow) is routed through a cooling and water management subsystem 36 (further described below) for purposes of removing product water from the flow.

As depicted in FIG. 1, in some embodiments of the invention, the anode exhaust flow may be re-circulated such that the anode exhaust flow passes through the cooling and water management subsystem 36 (to remove product water) and then exits with subsystem 36 and is communicated back to the anode inlet 14 via a communication line 14. More specifically, the re-circulated anode exhaust flow is combined with the incoming fuel flow from the fuel source 30 to produce the fuel flow to the anode inlet 14. The re-circulated anode exhaust flow may aid in the humidification of the anode chamber of the fuel cell stack 12, as further described in U.S. patent application Ser. No. 11/823,552, entitled, "ANODE HUMIDIFICATION," which was filed on Jun. 28, 2007 and is hereby incorporated by reference in its entirety.

The incoming oxidant flow to the fuel cell stack 12 is produced by an oxidant flow source 40, which may be, as examples, an air blower or compressor, depending on the particular embodiment of the invention. The oxidant flow that is produced by the oxidant flow source 40 is received at a cathode inlet 20 of the fuel cell stack 12 and is communicated through the oxidant flow channels of the stack 12. In this regard, the communication of the oxidant flow promotes the corresponding electrochemical reactions in the fuel cell stack 12 to produce power for the electrical load 100. In accordance with some embodiments of the invention, the fuel cell stack 12 includes a cathode outlet 22, at which appears the corresponding cathode exhaust from the cathode chamber of the fuel cell stack.

The cooling and water management subsystem 36, in general, regulates the temperature of the fuel cell stack 12 and controls the amount of product water in the system 10. More specifically, the subsystem 36 includes a reservoir 110, which stores water that is communicated through the fuel cell stack 12 for purposes of regulating the stack's temperature. In this regard, the subsystem 36 supplies the water flow to a coolant inlet 26 of the fuel cell stack 12. Inside the fuel cell stack 12, the water flows through the coolant channels and exits the stack 12 at a coolant outlet 28 where the water flow is directed back to the subsystem 36 and into the reservoir 110. As further described below, the subsystem 36 regulates the rate of the water flow for purposes of regulating the temperature difference between the coolant inlet and outlet, and a fan (described below) controls the coolant inlet temperature at the fuel cell stack 12.

In addition to regulating the temperature of the fuel cell stack 12, the subsystem 36 also regulates the water balance in the fuel cell system 10. More specifically, in accordance with some embodiments of the invention, the subsystem 36 may humidify the oxidant flow to the fuel cell stack 12 for purposes of humidifying the cathode and anode chambers, as further described in the "ANODE HUMIDIFICATION" application.

In accordance with some embodiments of the invention, a vent line 37 extends from the coolant and water management subsystem 36. As described further below, the vent line 37 communicates from the subsystem 36, the vapour portion of the oxidant exhaust and the vapour portion of the anode purge. As further described below, the exhaust from the vent line 37 is combined at its outlet with cooling air produced in the cooling and water management subsystem 36. The management and monitoring of the concentration of hydrogen, which appears at the outlet of the vent line 37 is described in U.S. patent application Ser. No. 11/821,707, entitled, "VENTILATION FOR FUEL CELL POWER UNIT," filed on Jun. 25, 2007 and U.S. Ser. No. 11/820,725, entitled, "ANODE PURGE GAS DILUTION," filed on Jun. 20, 2007, each of which is hereby incorporated by reference in its entirety.

The humidified cathode flow passes through the oxidant flow channels of the fuel cell stack 12 and returns to the subsystem 36 via the cathode outlet 22. The cathode exhaust, in turn, contains water, which is removed by the subsystem 36 and communicated to the reservoir 110. As described herein, the subsystem 36 regulates the amount of water that is removed from the cathode exhaust flow for purposes of maintaining either a neutral or a positive water balance in the fuel cell system 10.

Among the other features of the fuel cell system 10, in some embodiments of the invention, the fuel cell system 10 includes a control subsystem 60. As described further below, the control subsystem 60 regulates operation of the various components of the fuel cell system 10, including the operation of the cooling and water management subsystem 36. In this regard, the control subsystem 60 controls operation of the subsystem 36 for purposes of regulating the system's water balance and regulating the temperature of the fuel cell stack 12. The control subsystem 60 may include, as examples, one or more microprocessors and/or microcontrollers, which receive communications from other controllers of the fuel cell system 10, sensed voltages and currents, etc., at input lines 72 and generates control signals, commands, etc. appears at output lines 74. In some embodiments of the invention, the control subsystem 60 may include memory that stores instructions that are executed by the one or more microprocessors/microcontrollers for purposes of controlling the subsystem 36, as well as various valves, motors, regulation circuits, etc. of the fuel cell system 10.

The fuel cell system 10 may also include, in accordance with some embodiments of the invention, a cell voltage monitoring circuit 70, which is electrically coupled to the fuel cell stack 12 for purposes of monitoring the stack's cell voltages. In this regard, depending on the particular embodiment of the invention, the cell voltage monitoring circuit 70 provides statistics to the control system 60 (minimum and maximum cell voltages, for example), provides a selective subset of the cell voltages to the control subsystem 60 or provides an indication of all of the cell voltages to the control subsystem 60. In accordance with other embodiments of the invention, the fuel cell system 10 does not include the cell voltage monitoring circuit 70. For example, in other embodiments of the invention, the fuel cell system 10 may include an analog circuit that measures the stack voltage. Thus, many variations are contemplated and are within the scope of the appended claims.

Figure 2:
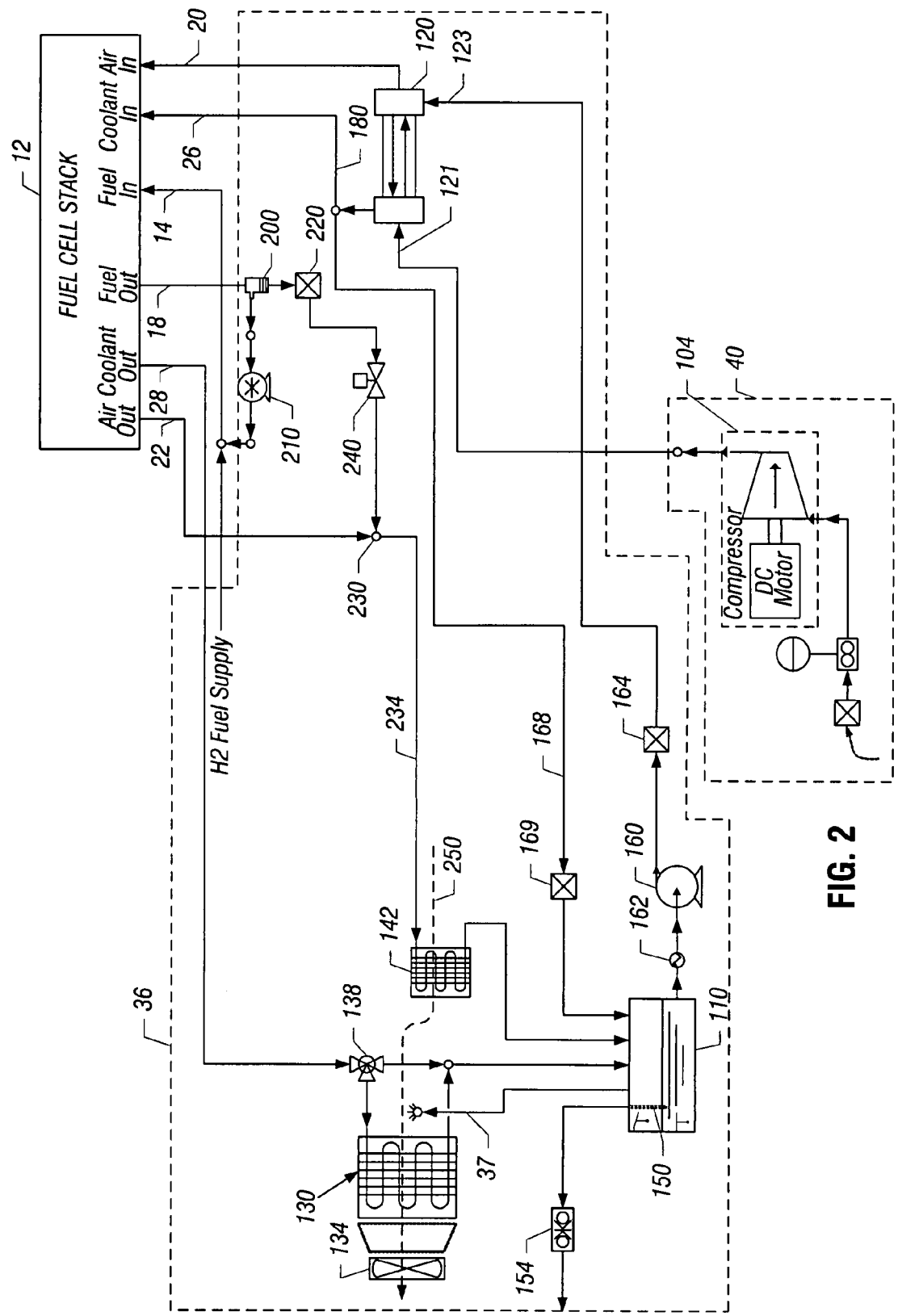
FIG. 2 is a schematic diagram of a cooling and water management subsystem of the fuel cell system of FIG. 1 according to embodiments of the invention.

Referring to FIG. 2, in accordance with some embodiments of the invention, the cooling and water management subsystem 36 includes the following water management circuit. The circuit includes a humidifier 120, which has a main inlet 121 and receives an air flow (i.e., the oxidant flow) that is produced by the oxidant flow source, such as a compressor 104. The humidifier 120 also includes a water inlet 123, which receives a water flow to be directed to the fuel cell stack 12. In accordance with some embodiments of the invention, the water and air flows are communicated through the humidifier 120 in a counterflow arrangement, and exit the humidifier 120 into the coolant 26 and oxidant 20 inlets, respectively, of the fuel cell stack 12. More specifically, in accordance with some embodiments of the invention, the outgoing coolant flow from the humidifier 120 may be routed to be a communication line 180 to the coolant inlet 26 of the fuel cell stack 12. A portion of the coolant flow may return to reservoir 110 via a bleed path that is established by a communication line 168 and a deionizing filter 169.

The humidified oxidant flow is communicated through the cathode flow channels of the fuel cell stack 12, and the flow exits the stack 12 at the cathode outlet 22, where the cathode exhaust flow is provided to a condenser 142. As depicted in FIG. 2, in accordance with some embodiments of the invention, the cathode exhaust flow may be combined at a mixing point 230 with an anode vapour flow that is produced from the anode re-circulation path, as further described below. After the flows are combined, communication line 234 routes the combined flow to the inlet of the condenser 142. As its name implies, the condenser 142 cools the cathode exhaust for purposes of causing water to condense from the flow. More specifically, a cooling air flow 250, produced by a fan 134 is directed over the condenser 142 for purposes of regulating the condensation of water from the cathode exhaust. The control subsystem 60 (see FIG. 1) may therefore control the speed of the fan 134 for purposes of controlling the amount of water that is condensed from the cathode exhaust. More specifically, the control subsystem 60 may increase the speed of the fan 134 for purposes of causing more water to condense from the cathode exhaust flow and correspondingly may decrease the speed of the fan 134 for purposes of causing less to be condensed from the cathode exhaust flow.

The water that is condensed from the cathode exhaust flow is communicated from the condenser 142 into the reservoir 110. In accordance with some embodiments of the invention, the control subsystem 60 receives an indication of the water level in the reservoir 110 via a water level sensor, or switch 150. Thus, the control subsystem 60 may control the speed of the fan 134 based at least in part on the detected water level in the reservoir 110, such that the water level is maintained at a positive rate of increase or a neutral level in the tank 110. For a positive rate of water accumulation, a de-watering valve 154 may be activated (either by the control subsystem 60 or without intervention from the control subsystem 60, depending on the particular embodiment of the invention) to ensure that the water level in the reservoir 110 does not exceed a predefined upper threshold level. In some embodiments of the invention, the switch 150 or another level switch or sensor indicates the need to de-water and causes the valve 154 to open. However, other variations are contemplated. For example, in stationary systems, the high level and dewatering may be accomplished by a simple overflow drain hole.

The cooling and water management subsystem 36, in accordance with some embodiments of the invention, includes the following coolant circuit. The coolant circuit includes a coolant pump 160, which uses the reservoir 110 as a sump to supply the water flow to the coolant circuit. In this regard, the pump 160 pumps water from the reservoir 110 through a filter 164 and into the water inlet 123 of the humidifier 120. A coolant heater 162, which may be located (for example) upstream of the pump 160 uses electrical energy supplied by the fuel cell stack 12 to heat the coolant to help maintain proper operating temperatures during times of low ambient temperature and/or startup. However, the heater 162 may be omitted in accordance with other embodiments of the invention.

The water flow circulates through the coolant channels of the fuel cell stack 12 and receives thermal energy from the fuel cell stack 12 in the circulation. The heated water flow exits the fuel cell stack 12 at the coolant outlet 28. In accordance with some embodiments of the invention, the control subsystem 38 (see FIG. 1) controls the pump 160 to regulate its speed for purposes of controlling the temperature difference between the coolant inlet 26 and outlet 28. In this regard, the fuel cell system 10 may include one or more temperature sensors such as temperature sensors at the coolant inlet 26 and outlet 28 (not depicted in FIG. 2) that is located near the coolant outlet 28 for purposes of monitoring the temperature difference so that the control subsystem 38 increases the speed of the coolant pump 160 for purposes of lowering the temperature difference and decreases the speed of the coolant pump 160 for purposes of increasing the temperature difference.

The coolant outlet 28, in accordance with some embodiments of the invention, is coupled to an inlet of a three-way valve 138. The three-way valve 138 is part of a thermostat that controls when the water flow from the fuel cell stack 12 is communicated through a heat exchanger 130. In general, during the normal operation of the fuel cell system 10, the thermostat operates the three-way valve 138 to direct the water flow through the coil of a primary heat exchanger 130 for purposes of removing thermal energy from the water flow. However, during times of low water temperature, such as during the start up of the fuel cell system 10, the thermostat operates the three-way valve 138 to bypass the heat exchanger 130 such that the water flows from the fuel cell stack 12 directly into the reservoir 110.

In accordance with embodiments of the invention described herein, the removal of thermal energy from the water flow is controlled by the speed of the fan 134. More specifically, the control subsystem 60 controls the speed of the fan 134 to regulate the temperature at the coolant inlet 26. Thus, if more thermal energy is to be removed, the control subsystem 60 increases the speed of the fan to increase the corresponding air flow over the coil of the heat exchanger 130 to lower the coolant inlet temperature. Conversely, to decrease the amount of thermal energy removed from the water flow, the control subsystem 60 decreases the speed of the fan 134 to decrease the corresponding air flow over the coil of the heat exchanger 130 to increase the coolant inlet temperature. From the heat exchanger 130, the water flow returns to the reservoir 110.

Thus, as described herein, the control subsystem 60 controls the speed of the fan 134 to regulate both the water flow outlet or inlet temperature of the fuel cell stack 12 and the water balance of the fuel cell system 12. In some embodiments of the invention, the control subsystem 60, in its control of the fan speed, first adjusts the speed of the fan 134 to achieve a neutral or positive water balance in the fuel cell stack 12 and then increases the speed of the fan as needed to maintain the outlet water temperature at or below a predefined threshold temperature. In some embodiments of the invention, the control of the temperature difference across the stack 12 may be also regulated by controlling the speed of the pump 160. Thus, many variations are contemplated and are within the scope of the appended claims.

Another aspect is that for portable applications where the amount of hydrogen fuel is fixed by the tank size, the reservoir 110 may be sized such that it holds the entire amount of water that could be produced from that tank of hydrogen as the amount of available hydrogen equates to water.

Among the other features of the coolant water and management subsystem 36, the subsystem 36 includes components to remove product water from the anode re-circulation path. More specifically, the subsystem 36 includes a fluid seal, or water trap 200, which is connected to the anode outlet 18 for purposes of collecting product water from the anode exhaust. The collected product water is intermittently purged from the water trap 200 via the opening of a valve 240 (a solenoid valve, for example) to the mixing point 230. The dryer anode gas exits the water trap 200 and may, for example, pass through a re-circulation blower 210 to the communication 80 so that the re-circulated and dryer anode exhaust is combined with the incoming fuel flow from the fuel flow source (FIG. 1).

Other variations are contemplated and are within the scope of the appended claims. In accordance with some embodiments of the invention, a control strategy may be used, which maintains a neutral communication of water in the reservoir 110 by increasing the fan speed when the water level in the reservoir is low and decreases the fan speed when the level is high. Hence, the decrease in the fan speed increase the stack temperature such that more product water leaves the reservoir 110 in the vapour form, and the rate of liquid water production is negative.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A fuel cell system comprising:
    a fuel cell stack to communicate a reactant flow and communicate a water flow;
    a reservoir;
    a water management circuit adapted to remove water from the reactant flow and store the water in the reservoir;
    a cooling circuit adapted to generate the water flow communicated through the fuel cell stack from the water in the reservoir; and
    a fan to control the amount of water removed from the reactant flow to regulate a water level of the reservoir and control removal of thermal energy from the water flow to regulate a temperature of the fuel cell stack.

2. The fuel cell system of claim 1, wherein the reactant flow comprises an oxidant flow or a fuel flow.

3. The fuel cell system of claim 1, further comprising:
    a control subsystem to control a speed of the fan to regulate the water level of the reservoir and regulate the removal of the thermal energy from the water flow.

4. The fuel cell system of claim 3, wherein the control subsystem is adapted to control the speed of the fan to regulate a temperature of the water flow at an inlet of the fuel cell stack.

5. The fuel cell system of claim 3, wherein the control subsystem is adapted to control the speed of the fan to maintain a positive or neutral accumulation of water in the reservoir.

6. The fuel cell system of claim 5, further comprising:
    a level indicator to indicate a water level of the reservoir,
        wherein the control subsystem is adapted to base the control of the fan speed at least in part on the water level indicated by the level indicator.

7. The fuel cell system of claim 1, wherein the cooling circuit comprises a pump to regulate a temperature gradient of the water flow across the fuel cell stack.

8. The fuel cell system of claim 1, wherein the cooling circuit comprises a heat exchanger to communicate the water flow, the heat exchanger to receive an air flow generated by the fan.

9. The fuel cell system of claim 1, wherein the water management circuit comprises a condenser to communicate the reactant flow, the condenser to receive an air flow generated by the fan.

10. The fuel cell system of claim 1, further comprising:
    a humidifier to humidify the reactant flow in response to the water flow.

11. The fuel cell system of claim 10, wherein the humidifier is adapted to counterflow the reactant flow and the water flow.

12. The fuel cell system of claim 1, wherein the reactant flow comprises an oxidant and is further adapted to remove water from a fuel flow that is re-circulated from an anode exhaust of the fuel cell stack to an anode inlet of the fuel cell stack.

13. A method usable with a fuel cell, comprising:
    communicating a reactant flow through the fuel cell;
    communicating a water flow through the fuel cell, including communicating the water flow through a circuit that includes a reservoir;
    removing water from the reactant flow and storing the removed water in the reservoir; and
    operating a fan to control the amount of water removed from the reactant flow to regulate a water level of the reservoir and control removal of thermal energy from the water flow to regulate a temperature of the fuel cell.

14. The method of claim 13, wherein the act of operating the fan comprises controlling a speed of the fan to regulate the water level of the reservoir and regulate the removal of the thermal energy from the water flow.

15. The method of claim 14, wherein the act of controlling the speed of the fan comprise controlling the speed to regulate a temperature of the water flow at an inlet of the fuel cell.

16. The method of claim 13, wherein the act of controlling the speed of the fan comprises controlling the speed of the fan to maintain a positive or neutral accumulation of water in the reservoir.

17. The method of claim 16, further comprising:
    determining a water level of the reservoir,
    wherein the act of controlling the fan is based at least in part on the determined water level.

18. The method of claim 13, further comprising:
    controlling a pump to regulate a temperature of the water flow at an outlet of the fuel cell.

19. The method of claim 13, wherein the act of communicating the water flow comprises communicating the water flow through a heat exchanger, and the act of operating the fan comprises controlling the fan to control removal of thermal energy from the water flow by the heat exchanger.

20. The method of claim 13, wherein the act of communicating the reactant flow comprises communicating the reactant flow through a condenser, and the act of operating the fan comprises controlling the fan to control removal of water from the reactant flow by the condenser.

21. The method of claim 13, further comprising:
    humidifying the reactant flow.

22. The method of claim 21, wherein act of humidifying comprises:
    counterflowing the reactant flow and the water flow.

23. The method of claim 13, wherein the reactant flow comprises an oxidant flow or a fuel flow.

* * * * *